(12) United States Patent
Fernandez et al.

(10) Patent No.: US 6,957,394 B1
(45) Date of Patent: Oct. 18, 2005

(54) RENDERING CONTROLS OF A WEB PAGE ACCORDING TO A THEME

(75) Inventors: Roland L. Fernandez, Woodinville, WA (US); Richard W. Stoakley, Seattle, WA (US); Gregory L. Raiz, Bellevue, WA (US); Yin Xie, Bellevue, WA (US); Filipe Fortes, Pittsburgh, PA (US); Christopher A. Evans, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 09/728,725

(22) Filed: Dec. 1, 2000

(51) Int. Cl.[7] .................. G06F 15/00; G06F 17/00; G06F 17/21; G06F 17/24; G06F 3/00
(52) U.S. Cl. .................. 715/760; 715/513; 715/733; 715/744
(58) Field of Search ................ 345/744, 760, 345/762, 764, 731, 735, 746, 765; 715/513, 715/524, 517, 908, 733, 744, 746, 760, 500.1

(56) References Cited

U.S. PATENT DOCUMENTS 5,950,001 A * 9/1999 Hamilton et al. ........... 717/107
6,342,907 B1 * 1/2002 Petty et al. ................. 345/762

OTHER PUBLICATIONS

Cowen, Amy. "10 Questions About Meta Data". Sep. 7, 1999: pp. 1 and 14.*
"Style Sheets". Style Sheets in HTML documents. [Online] http://www.w3.org/TR/html4/present/styles.html.*
"Style Sheets". Style Sheets in HTML Documents Dec. 24, 1999: pp. 2-11. [Online] Available http://www.w3.org/TR/REC-html40/present/styles.html.*
"The New Meta Tags Are Coming—Or Are They?". The Search Engine Report Dec. 4, 1997. [Online] Available http://searchenginewatch.com/sereport/article.php/2165781.*
Chuck White, "Positioning With Cascading Style Sheets: Extending CSS to support the positioning of HTML elements," *Web Techniques*, Dec. 1997, pp. 43-47.
Jacco van Ossenbruggen, et al., "Requirements for Multimedia Markup and Style Sheets on the World Wide Web," *Computer Networks and ISDN Systems 30*, 1998, pp. 694-696.
Howard Spector, "Linking With Style," *Web Techniques*, Oct. 1998, pp. 73-76.
Brian Thomas, "Cascade Effects," *SPIE—The International Society for Optical Engineering*, Jan.-Feb. 1999, pp. 89-90.
Michael Floyd, "Cascading Style Sheets: To Hell With Standards," *Web Techniques*, Mar. 1999, pp. 42-46.
Antonio N. Mione, "HTML in Style: Using Cascading Styles Sheets,"*Digital Systems Report*, Spring 1999, pp. 1-7.
Antonio N. Mione, "More on Cascading Style Sheets: Properties and Values in Depth," *Digital Systems Report*, Summer 1999, pp. 1-8.

* cited by examiner

*Primary Examiner*—John Cabeca
*Assistant Examiner*—Namitha Pillai
(74) *Attorney, Agent, or Firm*—Shook, Hardy & Bacon, L.L.P.

(57) ABSTRACT

A method of rendering a graphical component of a web page on the display of a computer is provided. The computer has an appearance manager that is adapted to render a graphical component upon receiving a request for the graphical component. The method includes a request by the web page for a graphical component to be rendered on the display. Next, it is determined whether a defined theme META tag is present in the web page. If the theme META tag is present, the rendering request for the graphical component is routed to the appearance manager of the computer. Upon receiving the rendering request, the appearance manager assigns themed appearance characteristics to the graphical component and renders the graphical component on the display.

7 Claims, 8 Drawing Sheets

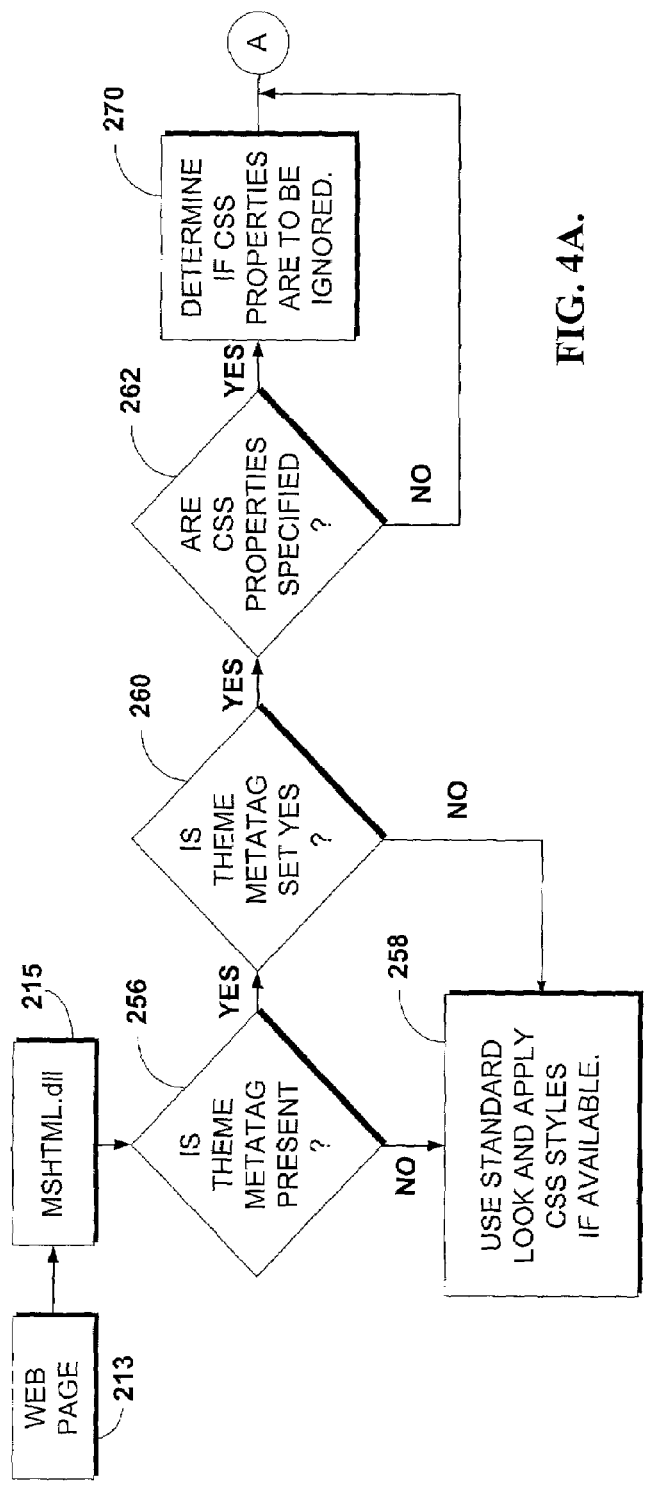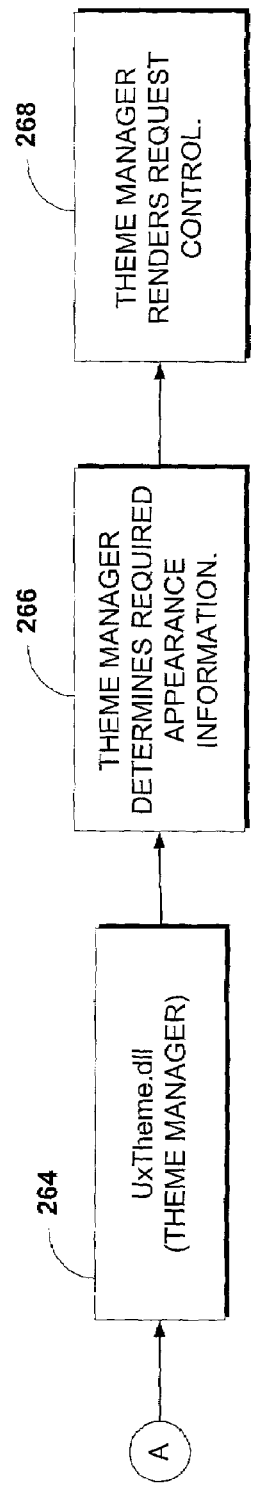
FIG. 4A.
FIG. 4B.

RENDERING CONTROLS OF A WEB PAGE ACCORDING TO A THEME

CROSS-REFERENCE TO RELATED APPLICATION

Not Applicable.

TECHNICAL FIELD

The present invention relates to a computer system and, more particularly, to a computer system and method that allow the controls of a web page to be rendered by the operating system according to a theme.

BACKGROUND OF THE INVENTION

Computer users in both the business and home environment have become accustomed to using a computer with a graphical operating system. For example, many users operate computers having a Microsoft Corporation "WINDOWS" operating system thereon. Certain components of these graphical operating systems are known as "controls." For example, a control may be an "OK" button, which is generally a rectangular button with "OK" written in it. By moving the cursor over the button and clicking on the mouse, a known operation will begin that is associated with the control. Many other controls exist, with examples including scroll bars, dialog boxes and sliders.

These controls are used not only by stand-alone applications on a computer, but are also used in a network environment, such as the Internet. In this networked environment, the documents or "web pages" are currently created using Hyper Text Markup Language (HTML) tags and Cascading Style Sheet (CSS) properties. Together, these elements dictate how a web page will look. For example, to create a typical button on a page, the author of the web page would write: "<input type=button value='Button'>". If the web page author desired a customized button, the author might write: "<input type=button value='Button' style='background-color:blue;color:white; border:solid red'>". The resulting button is thus customized using the style to create a button having a blue background with white lettering and a solid red border. As can then be seen, CSS properties are used by a website author to specify the colors, fonts and border styles for a control on the page being created. Further, a web author may specify an external style sheet, which is not integral with the web page being created. This allows the style sheet to be changed without modifying the source HTML web page document. These external style sheets may be shared among several documents.

However, the CSS properties are not associated with the operating system of the computer. As such, if the architecture of the operating system is updated, which may include updated controls, the web pages or HTML-based applications utilizing CSS properties will not get any benefit from such an update. As the operating system is updated or changed, it is difficult, if not impossible, to coordinate the look of the web pages created with the operating system. Therefore, while CSS Properties allow an author to create an appearance that is cohesive across a created website or HTML-based applications, they do not allow an author to utilize controls that are consistent with other websites and with the operating system.

It would be beneficial to have a computer system and method that allows the controls used on a website or within an HTML-based application to have the same appearance as other controls used across the operating system. For example, some of the operating system may be implemented in the Internet environment, such as on HTML documents. It would be desirable for the controls used on these HTML documents to appear the same as controls in a non-HTML document. This is especially important if the non-HTML controls are being rendered according to a specified theme, or set of defined appearance characteristics. If the controls on the HTML documents and the controls in the non-HTML documents are rendered according to the same theme, a more desirable look could be achieved.

SUMMARY OF THE INVENTION

Generally described, a method of rendering a graphical component of a web page on the display of a computer is provided. The computer has an appearance manager that is designed to render a graphic components according to the currently selected theme. The method includes a request by the web page for a graphical component to be rendered on the display. Next, it is determined whether theming is enabled for the web page. A defined theme META tag must be present and specify a "yes" value for theming to be enabled. If it is determined that theming is enabled for the web page and the appearance manager is active, a rendering request for each defined part of the graphical component is routed to the appearance manager of the computer. Upon receiving the rendering request, the appearance manager renders the specified part on the display according to the associated information in the currently selected theme and the current "state" of the part.

A method of rendering a graphical component of a web page on the display of a computer is also provided where the web page is being hosted by an application. The computer has an appearance manager that is designed to render graphic components according to the currently selected theme and the part's current "state". After the web page is instantiated, the web page may request a graphical component to be rendered on the display. It is then determined whether a defined theming flag is set by the application. If the theming flag is set, the rendering request for the graphical component is routed to the appearance manager. The appearance manager then renders the specified part on the display according to the associated information in the currently selected them and the part's current "state".

A further method of rendering a graphical component of a web page on the display of a computer is provided by the present invention. The computer has an appearance manager that is designed to render graphic components according to the currently selected theme. The method includes requesting, by the web page, a graphical component to be rendered on the display. It is next determined whether the web page has specified cascading style sheet properties. If cascading style sheet properties are not specified, it is determined whether a theming is enabled for the web page. If theming is enabled for the web page, the rendering request for the graphical component is routed to the appearance manager. The appearance manager renders the specified part on the display according to the associated information in the currently selected theme and the part's current "state".

Additional advantages and novel features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein:

FIG. 4A is a flow chart illustrating one embodiment of the present invention;

FIG. 4B is a continuation of the flow chart of FIG. 4A;

DETAILED DESCRIPTION OF THE INVENTION

Figure 7:
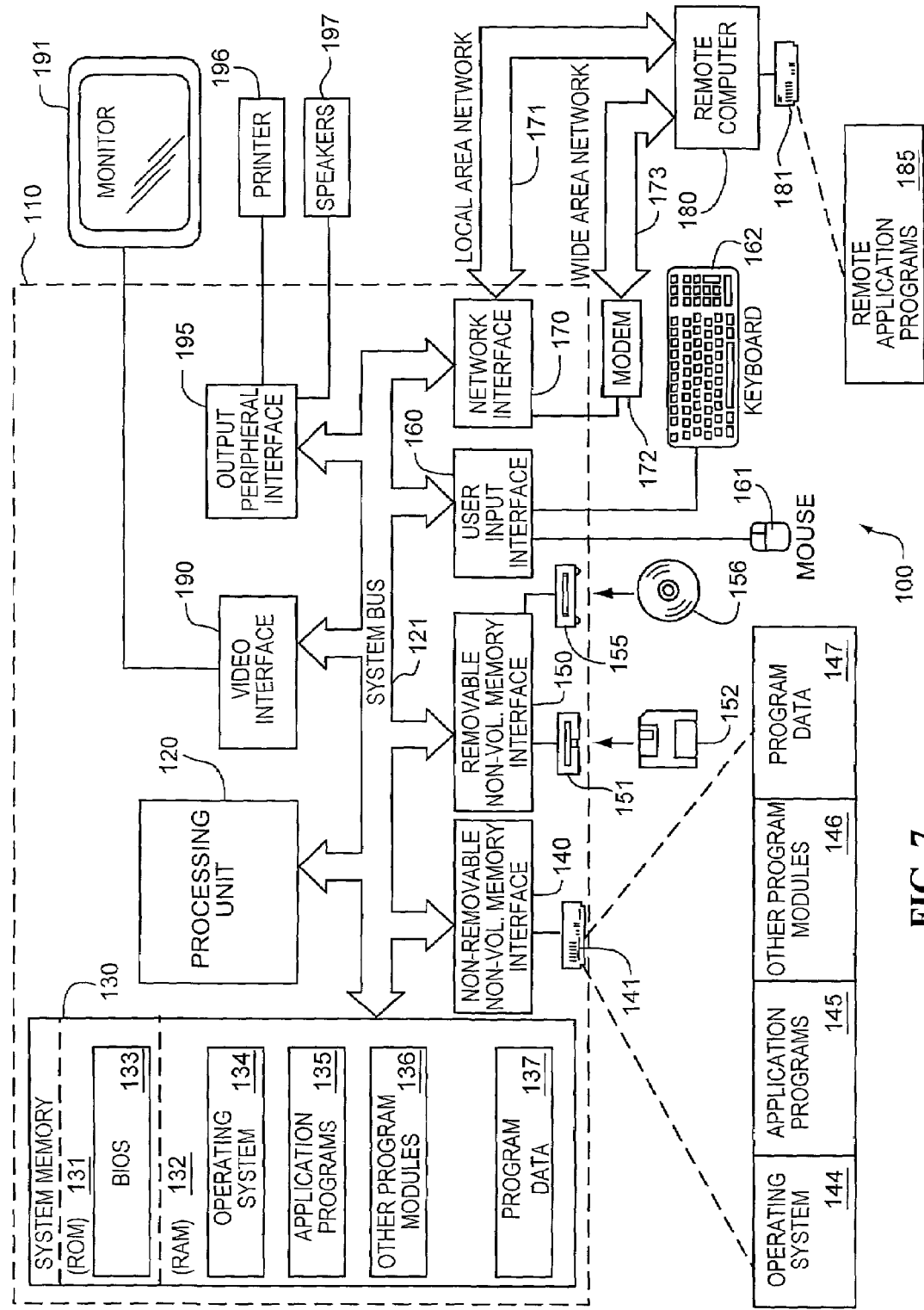
FIG. 7 is a block diagram of a suitable computing system environment for use in implementing the present invention.

The present invention provides a system and method for changing the visual style of HTML controls and components according to a visual theme within a graphical operating environment. FIG. 7 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 5A:
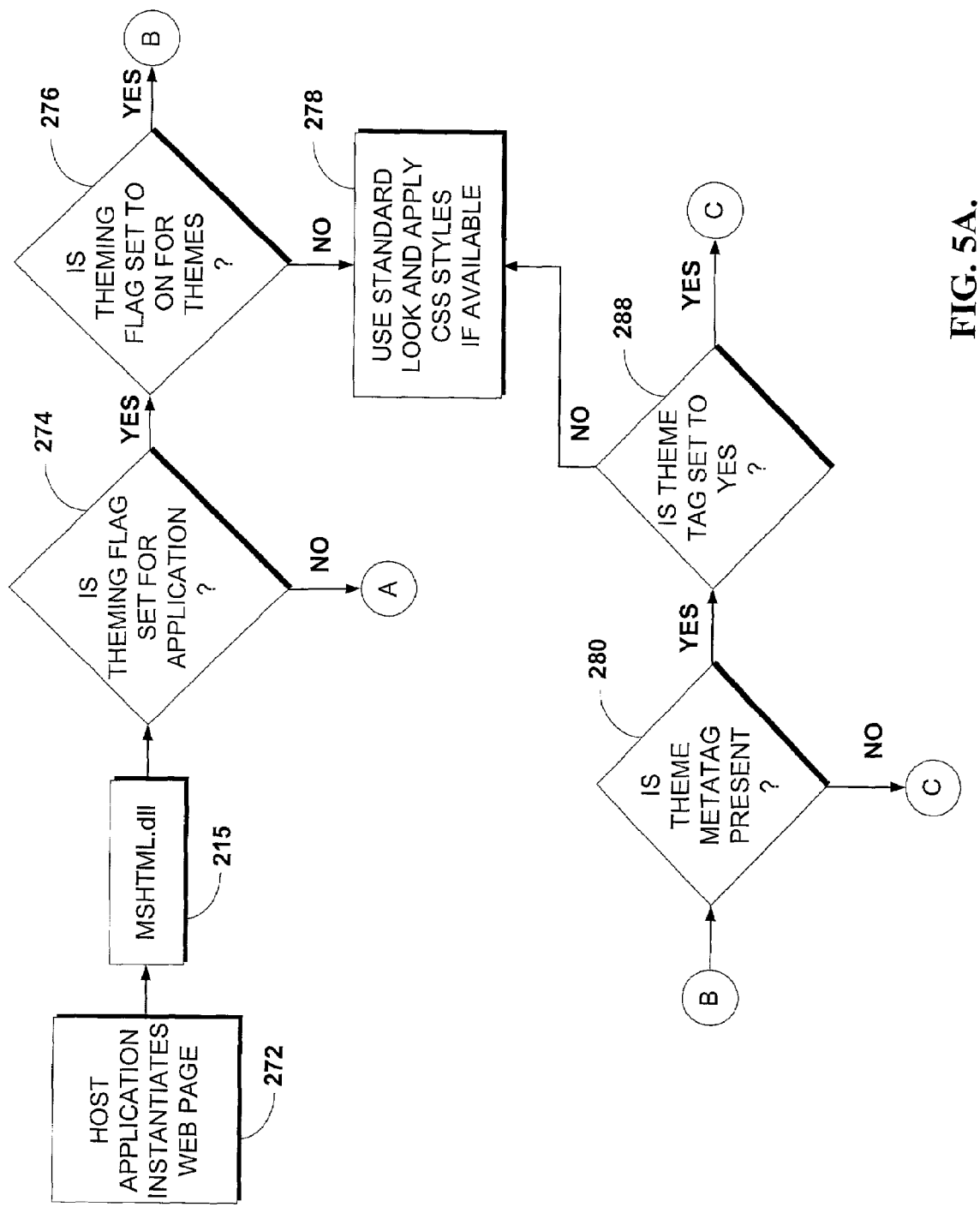
FIG. 5A is a flow chart illustrating another embodiment of the present invention.
Figure 5B:
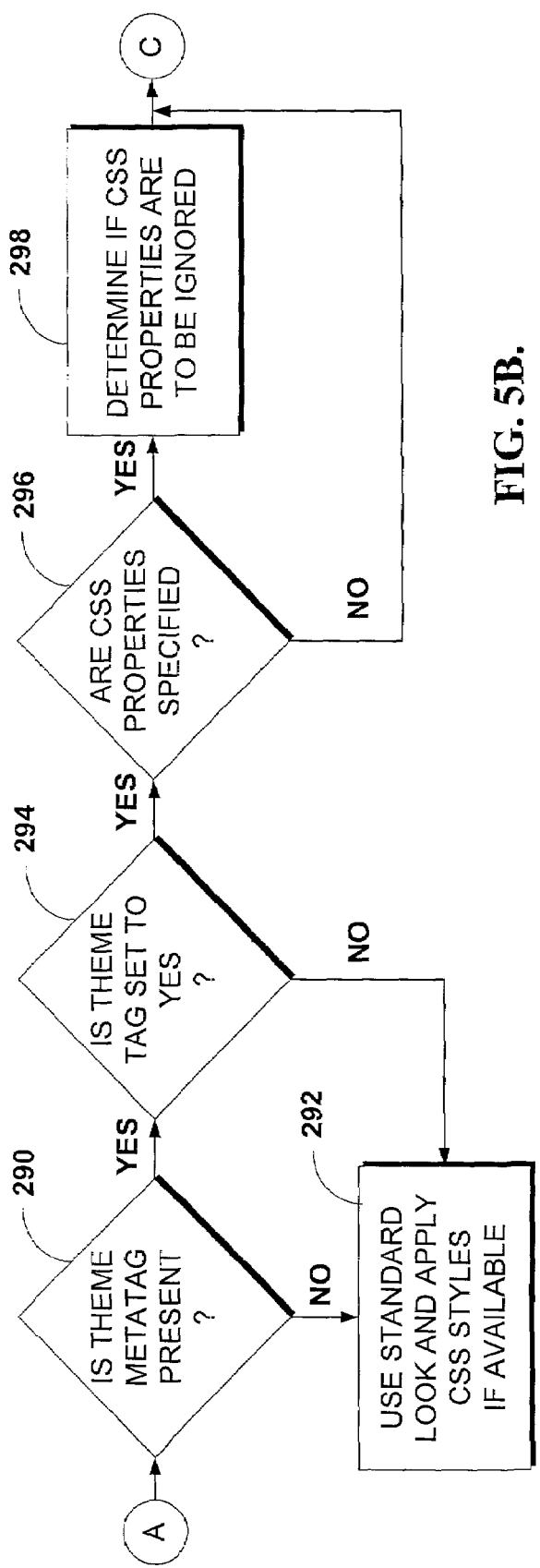
FIG. 5B is a continuation of the flow chart of FIG. 5A.
Figure 5C:
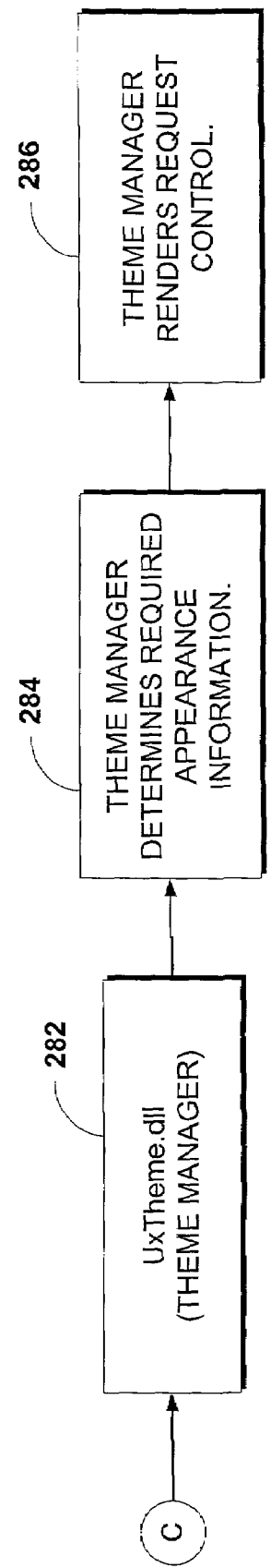
FIG. 5C is a continuation of the flow chart of FIGS. 5A and 5B.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 135 and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 135.

When the computer 110 is turned on or reset, the BIOS 133, which is stored in the ROM 131 instructs the processing unit 120 to load the operating system from the hard disk drive 141 into the RAM 132. Once the operating system 144 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 192.

In the present invention, operating system 134 is a graphical operating system having graphically displayed controls and components associated therewith. Controls include, but are not limited to, such things as scroll bars, push buttons and sliders. Other controls are within the scope of this invention, and are known to those of skill in the art. Other graphically displayed components are also within the scope of this invention. These components include, but are in no way limited to, non-client sections of the windows in the display, such as the frame surrounding an application display on the user interface, the minimize box, and the close box.

Figure 2:
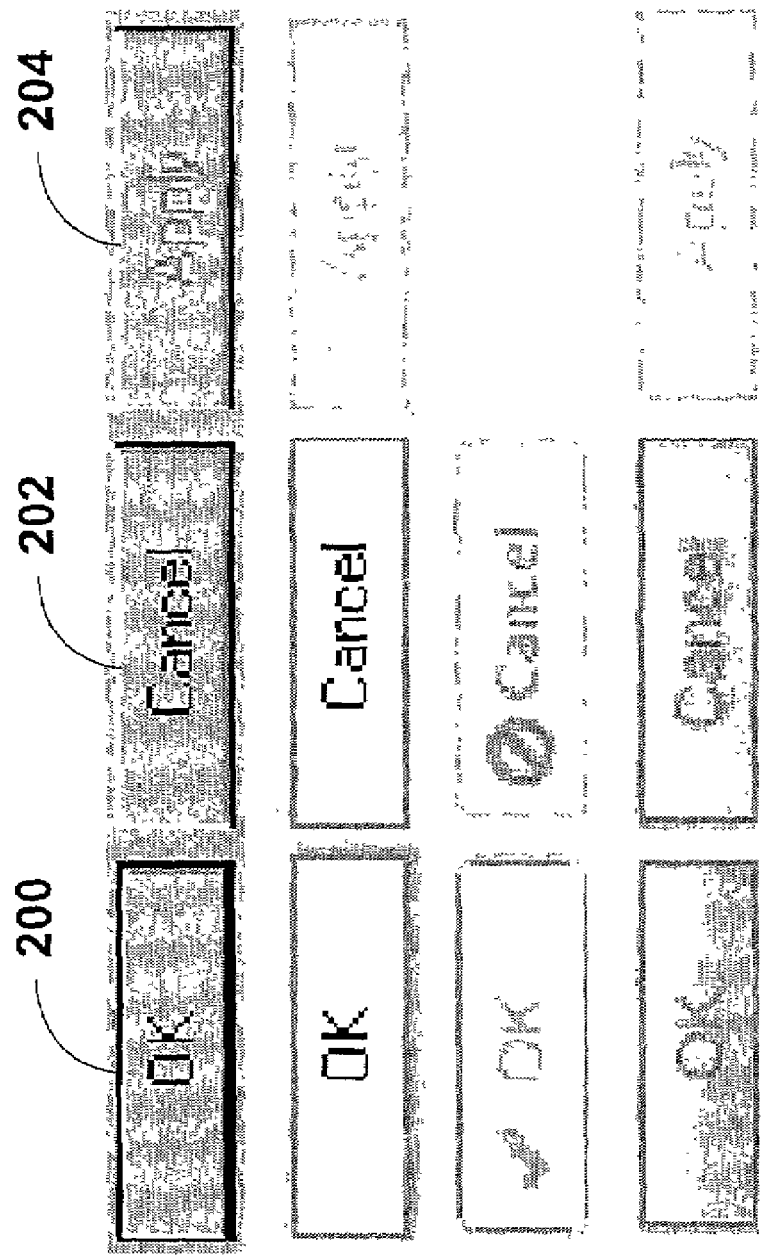
FIG. 2 is a representation of examples of graphical components having different themed appearances.

An example display of graphical components having a variety of appearances is seen in FIG. 2. As shown in FIG. 2, the controls may take the form of an OK button 200, a Cancel button 202 and an Apply button 204. The present invention allows the appearance of the controls to be rendered according to a theme and to be visually consistent between HTML and non-HTML documents. The invention allows the appearance of the controls to be altered beyond color and font selection. The layout of the parts of a control can be defined as desired. For example, a scroll bar could be rendered with the up and down arrow buttons adjacent to each other at the bottom of the scroll bar, instead of the up arrow and the top and the down arrow at the bottom. Further, the shape of the control and its parts may be defined. As shown in FIG. 2, four different overall appearances are shown for each of the buttons 200, 202 and 204. Each different appearance setting is coordinated and is called a "theme." Each theme is represented by one of the rows of buttons in FIG. 2. While only four themes are shown in FIG. 2, an unlimited variety of themes may be created for selection by the computer user. The theme is a collection or set of appearance characteristics relating to a particular subject or desired visual environment. As described below, the present invention allows the themed appearance of the controls to be consistently applied to both HTML and non-HTML documents and applications. If a theme is updated, the controls are automatically updated as well, including those used on web pages.

Figure 1:
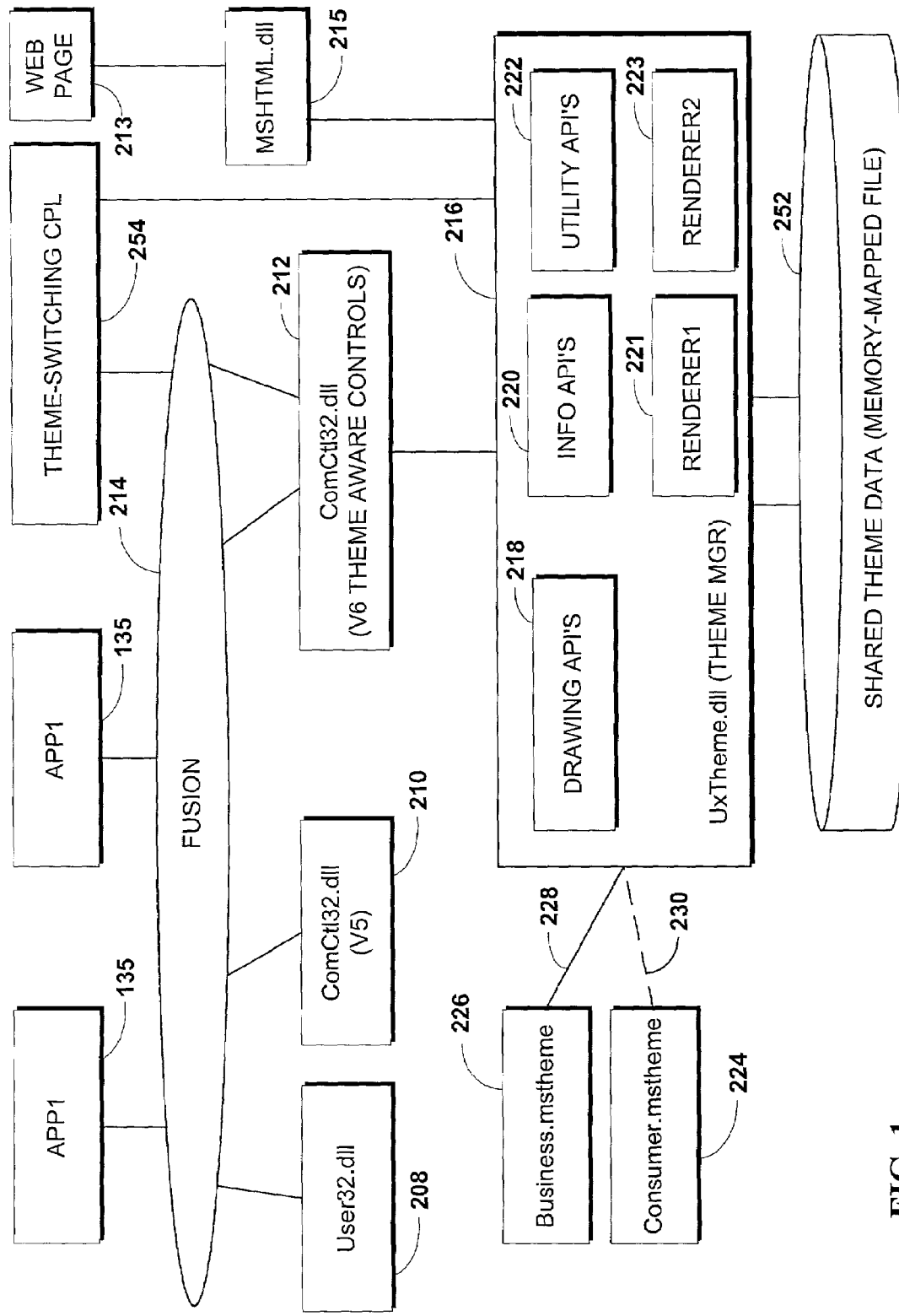
FIG. 1 is a schematic diagram illustrating the architecture used in the present invention.

Turning now to FIG. 1, the basic architecture used in the present invention is illustrated. The architecture is illustrated with example applications 135 that are open and running on the computer 110. The invention operates in an environment where the controls used by applications 135 are themed, as described below. One or more libraries, called dynamic link libraries or DLLs are present that contain the controls to be used. As an example, the DLL in the WINDOWS operating environment would be called User32.dll or ComCtl32.dll (V5), shown as 208 and 210, respectively, in FIG. 1. Libraries 208 and 210 exist within graphical operating system 134.

The present invention includes an additional DLL, shown as 212 in FIG. 1. In the WINDOWS operating environment, DLL 212 may be called ComCt132.dll (V6), as indicated in FIG. 1. This DLL is similar to library 210, in that it contains a number of predefined controls and graphical components that may be used by application 135. Broadly, DLL 212 contains a number of components that are to be graphically displayed. In library 212, however, the controls are defined differently, making them "theme aware." Rather than containing all of the software code to needed to render the control, the controls are defined with certain basic information or values about the control, for example, the location, parts and states of the controls.

The location is the position on the user interface where the control is desired. Parts are the different items that make up the control. For example, OK button 200 has a background part and a text part. As another example, a scrollbar control has an elongated rectangular shaft part, a smaller thumb part that slides within the shaft part, and an arrow part at each end of the shaft part. The state of a control describes the current appearance and functional state. For example, a button can be active, pressed, hot (when the mouse is over the control), disabled or inactive.

As stated above, in the prior art environment, libraries 208 and 210 are linked directly with applications 135. In the present invention, libraries 208, 210 and 212 are linked to the applications 135 through a fusion process 214. Fusion 214 enables the theming of controls in applications without needing to change the applications themselves to request the themable version of the controls. Fusion 214 enables each application 135 to load the specific version of the DLL 208, 210 or 212 at run time through the use of a manifest. The fusion manifest specifies the environment in which an application will run, which allows multiples versions of a DLL to exist on one machine. Thus, fusion 214 will map the request for OK button 200 so that it is rendered as a themable element in DLL 212 instead of a non-themable element from DLL 208. This allows an existing application to be themed without changing code of the application. Fusion 214 also allows the new themable controls to be placed in a different DLL from the existing DLL, which simplifies implementation and minimizes compatibility risks.

In the present invention, if a themed control is desired, DLL 212 will request rendering or drawing services from a theme manager DLL 216. Theme manager 216 provides the requested rendering services and draws the control on the display at the indicated location, with the indicated parts in the indicated states.

Theme manager 216 contains a series of APIs that allows library 212 to interact and communicate with the theme manager. The APIs allow a control author to define a control as a series of parts and states without the need for software rendering code. These APIs are generally divided into three types: drawing APIs 218, information APIs 220 and utility APIs 222. Drawing APIs 218 are generally used to render and assist in the layout of the needed control parts and other components. Information APIs 220 are generally used to obtain information about the current defined appearance of the controls to allow controls to be individually customized. Utility APIs 222 are those APIs used by parts of the operating system other than the controls, to control theme selection. Utility APIs 222 include functions that can be used to enumerate an installed theme and load it.

Drawing APIs 218 and information APIs 220 allow the author or creator of controls within DLL 212 to define the controls as a series of parts and states. The defined control is therefore abstracted from the rendering process of theme manager 216 and is also abstracted from the theme-defined appearance information or characteristics, as is more fully described below. Using APIs 218 and 220 the control author can create controls that are "theme-aware" and that are equipped to communicate with theme manager 216. This communication involves passing basic information or values to theme manager 216 that allow the theme manager to render the desired control, having the needed parts in the desired states.

Theme manager 216 also contains the renderers needed to execute the drawing instructions. For example, a border-fill renderer 221 could be used that allows different color themes to be applied to the controls. As another example, a bitmap renderer 223 could be used that defines the control parts as images. Other examples of renderers include using a vector definition language, portable network graphics (PNG) files, or portable document format files (PDF). It should be understood that the present invention is not limited to a particular rendering technology. If a different renderer is desired or needed, the drawing code of theme manager 216 is revised to add the renderer to theme manager 216.

The renderer within theme manager 216 renders the requested control according to an appearance theme that has been selected by the user of the computer. For example, appearance themes 224 and 226 are shown in FIG. 1. As shown, theme 224 may be a consumer theme and theme 226 may be a business theme. It should be understood, however, that other themes could be used and that the invention is in no way limited to the particular theme. For example, other themes could include a cartoon theme, a children's theme or a golf theme. As seen in FIG. 1, the user, as represented by the solid line 228 has selected business theme 226. Consumer theme 224 is available for selection, as represented by the broken line 230.

Figure 3:
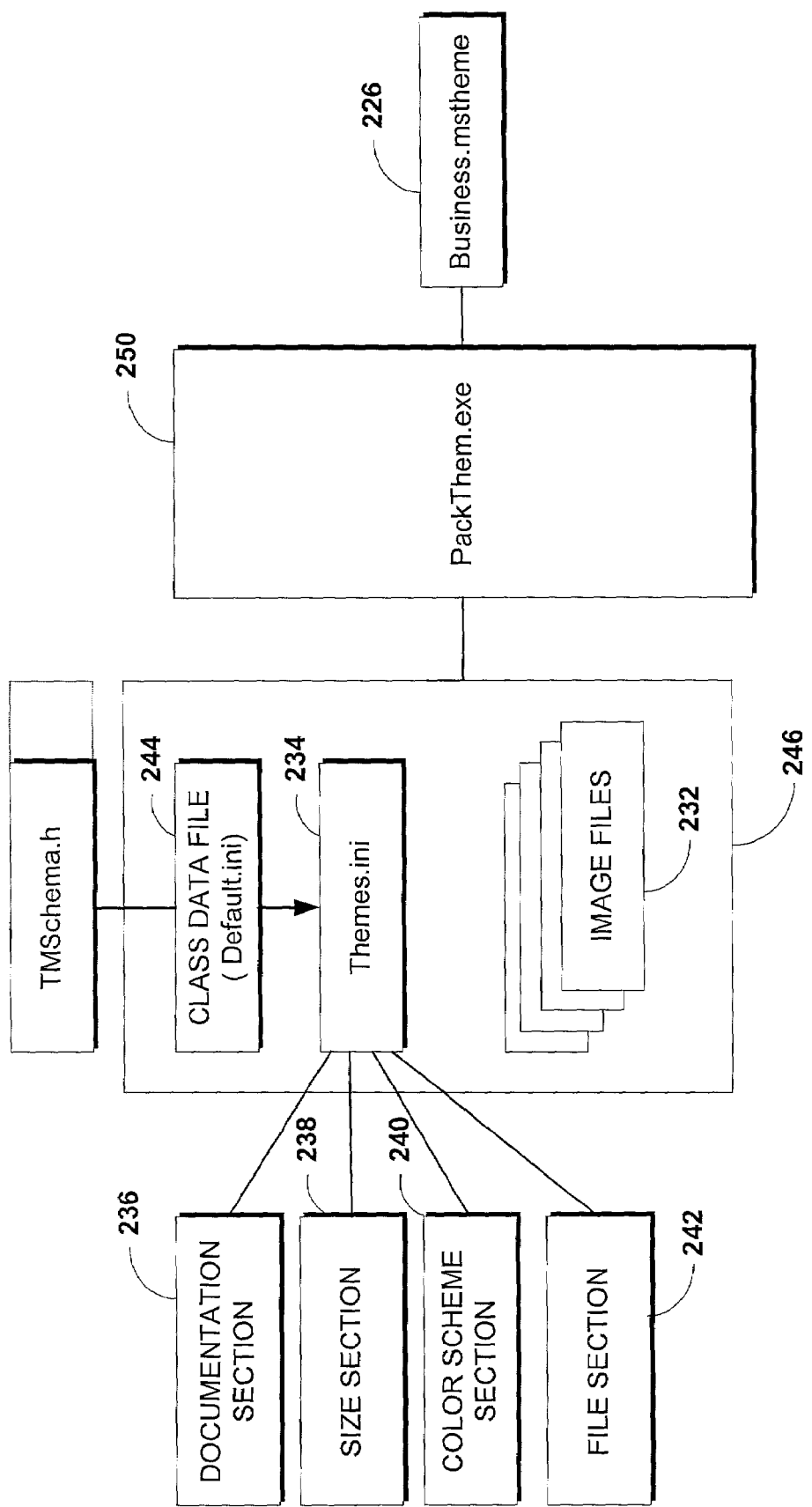
FIG. 3 is a schematic diagram illustrating the architecture of a theme file.

Each theme 224 and 226 has similar architecture. As seen in FIG. 3, business theme 226 includes a series of image files 232. Image files 232 are the image files that will be used by the particular theme. In this case, image files 232 are the image files that will be used by business theme 226. Business theme 226 also includes a themes.ini file 234. File 234 is a text file and can be created in either ANSI or UNICODE character sets. File 234 specifies the available color schemes and sizes available for the theme. In the case of theme 226, file 234 specifies the available color schemes and sizes available for business theme 226. File 234 therefore represents all of the variations of the theme to which it applies.

Theme file 234 consists of one or more sections. The sections within theme file 234 include a documentation section 236, a size section 238, a color scheme section 240 and a file section 242. Documentation section 236 is optional and may contain any property name. Size section 238 specifies the size name, such as "default size," "very small" or "very large." Color scheme section 240 is used to specify a simple color scheme name and an optional color scheme transformation associated with the color scheme name. File section 242 is used to specify a unique name for the class data file. The file section 242 will include a file name, a color scheme (from color scheme section 240) for that file name, and the sizes (from the size section 238) that the file will support.

Theme 226 includes a second .ini file labeled 244 in FIG. 3. File 244 is a class data file that contains the theme data for a specific size and color theme. File 244 may also contain defining sections. For example, file 244 may contain a globals section that defines the properties of the particular class of control. File 244 may also contain a section that allows the system metrics to be obtained and used. Finally, file 244 may contain a group of class sections. Each class section name contains a class name, an optional part name, and an optional state name. Within the section are the property/value pairs that define the appearance of the specified part or control. For example, a class name would be "slider" for the slider control. A part specified for the slider would be "track." States defined for the track part would be "normal," "disabled," and "hot." The class section name can also include an application (or "group") name, which specifies that the section only applies to a specific application.

Image files 232, theme file 234, including file 244 are broadly grouped together to make up theme directory 246. Theme directory 246 and a system schema file located within the theme manager 216 are used to load business theme 226. The system schema file is the file that defines property numbers for all of the properties involved in a particular theme and is basically a master definition file that allows the themed properties to be assigned a number corresponding to a defined appearance.

Theme directory 246 thus contains a theme.ini file 234, a class data file 244 and all of the image files 232 used by the theme. The contents of theme directory 246 can be packaged into a DLL file by packthem tool 250. Packthem tool 250 processes the theme.ini file by parsing it against the schema file for syntax errors and adding the .ini file to the package being built. Recognized properties from documentation section 236 are written to a package string table. Color scheme information from color scheme section 240 and size information from size section 238 is also written to a package string table. Each class data file 244 is also processed. As the class data file is processed, the file is parsed against the schema file for syntax errors. The class data file and any referenced image files are also added to the package being built.

The DLL file produced by packthem tool 250 is business theme file 226. File 226 contains the theme data and this theme data is isolated from control library 212. This allows different themes to be created and selected without changing the controls defined within library 212. Thus, control authors can create and define controls independently of the appearance or theme data. File 226 is in binary format and is passed into a shared theme data file 252 when business theme 226 is selected by the computer user, as best seen in FIG. 1. File 252 is a shared memory map file that can be accessed by all processes. Thus, when a theme is selected by the computer user, theme manager 216 will read the information for a defined theme file, such as file 226, and will place that information in a binary format in file 252 where all running processes have access to the binary information.

As best seen in FIG. 1, a theme-switching control panel 254 is provided that is in communication with theme manager 216. Panel 254 cooperates with a user interface that displays the available themes from which the user can select. As shown in FIG. 1, control panel 254 would allow a user to select business theme 226 or consumer theme 224. If, as has been discussed above, business theme 226 is selected and the user of the computer switches to select consumer theme 224, theme 224 will be loaded into shared memory map file 252 as binary data. Theme manager 216 also sends a message to all theme-aware controls that the theme has been changed. Each theme-aware control knows how to respond to this message.

As can be seen, from the above-description the controls requested by applications 135 can be themed to create controls having a desired set of visual characteristics. Returning to FIG. 1, a web page 213 is shown. Web page 213 is in communication with DLL library 215, labeled MSH-TML.dll in FIG. 1. DLL 215 is further in communication with theme manager 216. As with applications 135, web page 213 may need a control generated on the display of the computer for a variety of reasons. As stated above, it would be desirable if web page 213 was allowed to utilize the selected theme information so that the controls used by the web page were visually consistent with the other controls in the graphical operating environment. This is especially important when, as is increasingly becoming the case, the operating system shell is implemented in HTML format. As described below, the present invention allows the HTML controls needed by web page 213 to be themed consistently with the other controls generated by theme manager 216.

In a first embodiment, as is best seen in FIG. 4, web page 213 will request a control to be rendered on the user interface. This graphical request is routed through DLL 215. As represented by 256, the method of this embodiment involves first determining if a "theme" META tag is present. The theme META tag is a global flag used in the header of the HTML page. The theme META tag allows the web page author to globally opt in to the use of the themed controls generated by theme manager 216. Because this is a global flag, either all of the controls on the web page will be themed, or none of the controls will be themed.

As indicated at 258, if the theme META tag is not present in the header of the HTML document, then the standard look will be applied, along with any specified CSS styles. This option is available for the web page author that does not desire to have controls that look like the controls generated by the operating system. If the theme META tag is present, it must be determined if the theme META tag is set to YES or NO, as indicated at 260. If the theme META tag is set to NO, the standard look and CSS styles will be used, as indicated at 258. If the META tag is set to YES, the system will determine whether the web page 213 has other specified CSS properties, as shown at 262.

If web page 213 has not specified CSS properties and the theme META tag is present and specifies YES, a specific API called "OpenThemeData( )" within theme manager 216 is called. The class name of the control (i.e. "button" or "listbox") is passed along. If a theme is currently active and if that theme defines theme properties for the specified class name, theme manager 216 returns a "theme handle" that the control can then pass back to the theme manager whenever the it wants to draw a part of the control. If a NULL (=0) handle is returned, it means no theme information is available for the control and the control falls back to its normal drawing. The control code intercepts each "draw request" for the control and then iterates through each visible part, calling the theme manager 216 to help measure and layout the parts, and to draw each part, along with any accompanying text or icons. The control rendered by theme manager 216 will be consistent with the selected theme, such as business theme 226.

If web page 213 has specified CSS properties in addition to the theme META tag, the system will determine whether those properties are to be ignored, or honored, as shown at

270. CSS properties may be present, for example, if a web page author had previously created a page utilizing CSS properties to define the look of a control and later opted to utilize the theme META tag in the header of the HTML document. Rather than require the web page author to edit out of the web page all of the CSS properties, the system will look for a predefined list of properties that are to be ignored. Primarily, the ignored properties will be those that conflict with the themed aspects of the control. Other CSS properties, which do not conflict with the themed appearance aspects of the control, may be honored. Following the determination of 270, the request is routed to theme manager 216 and is processed as set forth above.

An example use of the theme META tag is shown below. The format is the standard format used in HTML programming and is not a complete page, but rather a small portion thereof demonstrating use of the theme META tag.

```
<HTML>
    <HEAD>
        <META HTTP-EQUIV="MSThemeCompatible" CONTENT="YES">
    </HEAD>
    <BODY>
        <INPUT TYPE=button value="button">
    </BODY>
</HTML>
```

In this example, the theme META tag is present in the HTML document. Further, the web page author has decided to set the theme META tag to YES. Therefore, the requested button will be rendered by theme manager 216 according to the selected theme, such as business theme 226. Using the above embodiment, a web page author can quickly and easily enable the controls requested in the web page to be rendered by theme manager 216 according to the selected theme. The controls of the web page will therefore be consistent with the themed appearance of the other controls generated by theme manager 216 that are used, for example, by applications 135. This can be done easily by the web page author by simply adding the theme META tag in the header of the HTML page.

Using the embodiment illustrated in FIG. 4, the controls of a web page will be themed if the web page author utilizes the theme META tag. For existing web pages, this requires the author of the web pages to add the META tag into the header of each of the pages, which is not a difficult task. This task can, however, be somewhat time consuming. This step can be eliminated for applications 135 that host or incorporate a web page into the application. For example, if an application utilizes a "help" function that utilizes HTML pages, the application is hosting those pages. In the art, it is said that the application instantiates the web pages. As above, it would be desirable for the controls of the instantiated web pages to be themed consistently with the other controls requested by the application. This embodiment of the present invention is seen in FIG. 5.

As seen in FIG. 5, the host application may instantiate a web page, as shown at 272, and may request a control. This request is routed through DLL 215. The system will determine, at 274, whether a theming flag has been set for the application. The theming flag operates somewhat similarly to the theme META tag and can operate in tandem therewith, as is more fully described below. In this environment, however, the theming flag is set at the application level, rather than at the web page level.

If the theming flag has been set for the application, the system will determine whether the flag is set to ON, as is shown at 276. If the theming flag is set, but is not set to ON, the requested control will use the standard look and will apply any CSS properties or styles that are specified, as shown at 278. If the theming flag is set to ON, the system will determine if the instantiated web page is using the theme META tag, as shown at 280. If the theme META tag is not present, the request will be routed to theme manager 216, as shown at 282. Upon receiving the request for the control, theme manager 216 will determine the appearance information for the control, as shown at 284, and will render the control on the display as shown at 286. The control rendered by theme manager 216 will be consistent with the selected theme, such as business theme 226.

If the system determines that the theme META tag is present at 280, the system will next determine whether the theme META tag is set to YES, as shown at 288. If the theme META tag is not set to YES, (i.e. the META tag is set to NO) the requested control will use the standard look and will apply any CSS properties or styles that are specified, as shown at 278. If the theme META tag is set to YES, the request will be routed to theme manager 216, as shown at 282. Upon receiving the request for the control, theme manager 216 will determine the appearance information for the control, as shown at 284, and will render the control on the display as shown at 286.

Returning to the determination at 274, if the theming flag is not set for the application, the system will determine whether the theme META tag is present for the instantiated web page, as shown at 290. If the theme META tag is not present, the requested control will use the standard look and will apply any CSS properties or styles that are specified, as shown at 292. If the theme META tag is present, it must be determined if the theme META tag is set to YES or NO, as indicated at 294. If the theme META tag is set to NO, the standard look and CSS styles will be used, as indicated at 292. If the META tag is set to YES, the system will determine whether the instantiated web page has other specified CSS properties, as shown at 296.

If the web page has not specified CSS properties in addition to the theme META tag, the request for the control will be routed to theme manager 216, as indicated at 282. Upon receiving the request for the control, theme manager 216 will determine the appearance information for the control, as shown at 284, and will render the control on the display as shown at 286. The control rendered by theme manager 216 will be consistent with the selected theme, such as business theme 226.

If the web page has specified CSS properties in addition to the theme META tag, the system will determine whether those properties are to be ignored, or honored, as shown at 298. Primarily, the ignored properties will be those that conflict with the themed aspects of the control. Other CSS properties, which do not conflict with the themed appearance aspects of the control, may be honored. Following this determination step, theme manager 216 as shown at 282-286 processes the request accordingly.

The flow chart illustrated in FIG. 5, results in the following table:

|  | Theming Flag ON | Theming Flag OFF | No Theming Flag |
|---|---|---|---|
| Theme META tag YES | Themed Controls | Unthemed Controls | Themed Controls |
| Theme META tag NO | Unthemed Controls | Unthemed Controls | Unthemed Controls |
| No Theme META tag | Themed Controls | Unthemed Controls | Unthemed Controls |

Utilizing this embodiment, the host application can set a theming flag to indicate whether themed controls are desired for the instantiated web pages. This eliminates the need for a web page author, having web pages that may be instantiated by the application, to go back to existing web pages and insert the theme META tag into the HTML documents. This embodiment allows for both the theming flag to be used as well as the theme META tag.

The embodiments discussed above with respect to FIGS. 4 and 5 represent a global solution. In other words, the embodiments result in the controls of a web page being themed, or not. If the controls are themed, then all of the controls in the web pageare themed. Authors of web pages and applications can quickly and easily use each of the above embodiments. However, neither embodiment allows the flexibility of a web page author to theme some controls and not others. It may be desirable to have such flexibility in certain instances.

Figure 6A:
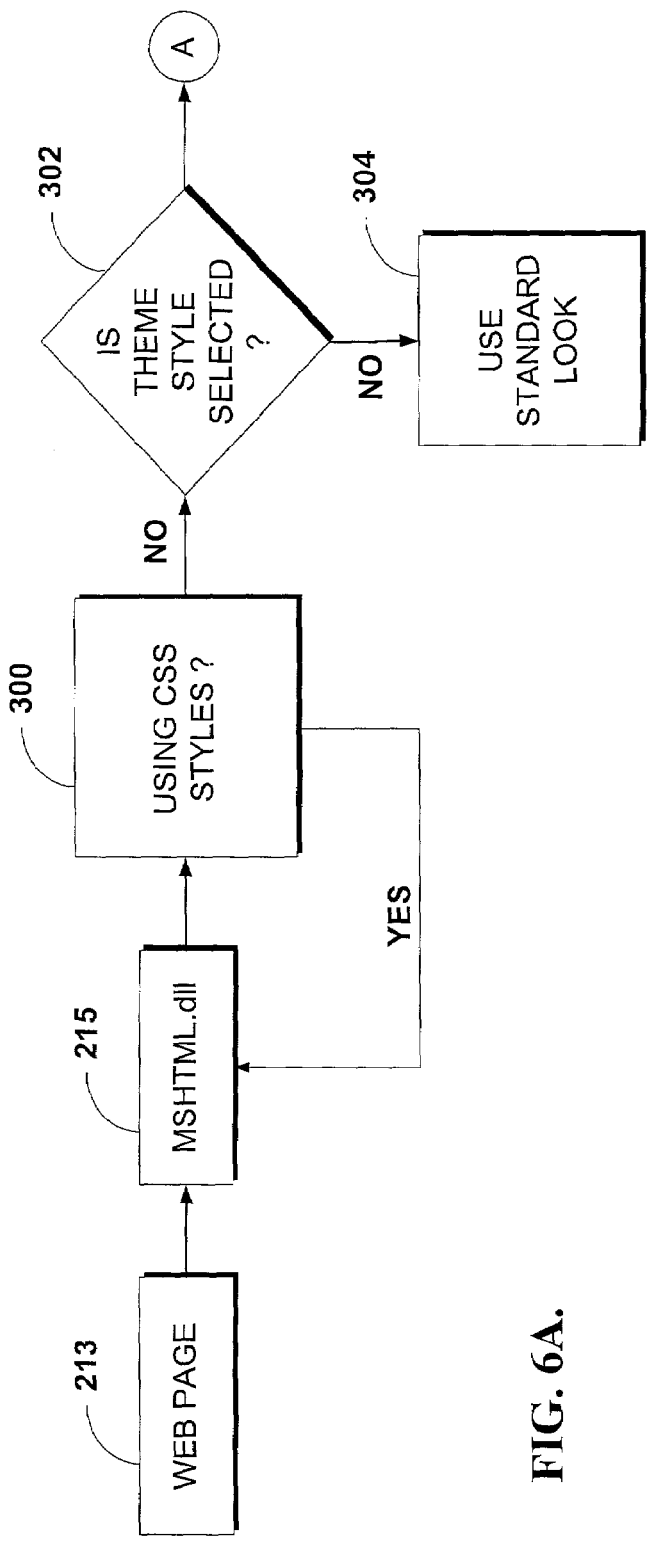
FIG. 6A is a flow chart illustrating yet another embodiment of the present invention.
Figure 6B:
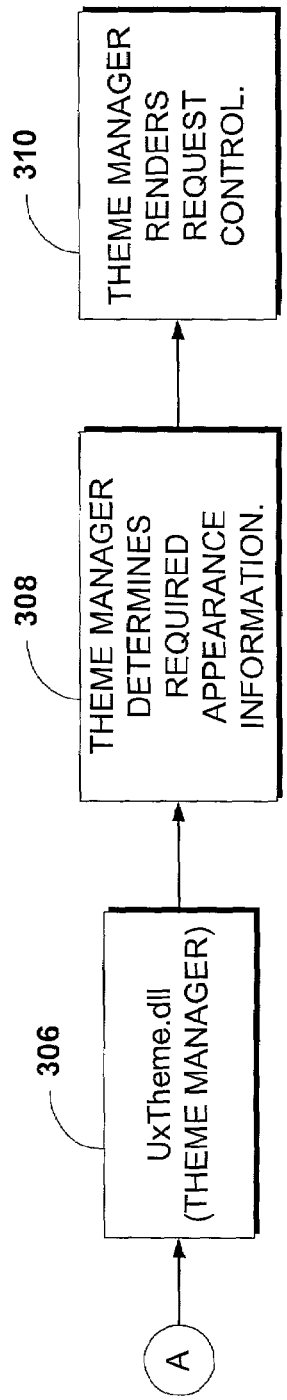
FIG. 6B is a continuation of the flow chart of FIG. 6A.

Another embodiment of the present invention is shown in FIG. 6. In this embodiment web page 213 requests a control to be rendered on the user interface. This request is routed through DLL 215. As represented by 300, the method of this embodiment involves first determining if CSS properties or styles are specified for the control by web page 213. If CSS styles are being used, the control will be rendered using the specified CSS properties and styles. If, however, CSS styles are not specified for the control, the system will next determine if a "theme style" has been specified by web page 213, as indicated at 302. If a theme style has not been specified, the control will be rendered using the standard look, as shown at 304. If a theme style has been specified by web page 213, the request for the control will be routed to theme manager 216, as indicated at 306. Upon receiving the request for the control, theme manager 216 will determine the appearance information for the control, as shown at 308, and will render the control on the user interface as shown at 310. The control rendered by theme manager 216 will be consistent with the selected theme, such as business theme 226.

Utilizing this embodiment, a web page author can specify that the certain controls of the page be themed by selecting the theme style. However, other controls of the page can be customized to appear differently than the standard look or the themed look by applying CSS properties and style sheets to those controls. While this embodiment requires slightly more effort on the part of the web page author, it offers the flexibility to have some, but not all, of the controls themed.

It can therefore be seen that the present invention allows the controls of a web page to appear like other themed controls. The result is HTML documents and web pages that have controls that look and feel consistent with other controls the user of the computer is experiencing. Further, as updates or revisions are made to a theme, the web pages automatically are updated as well, requiring no further action on the part of the web page author.

Alternative embodiments of the present invention will become apparent to those skilled in the art to which it pertains upon review of the specification, including the drawing figures. Accordingly, the appended claims rather than the foregoing description define the scope of the present invention.

We claim:

1. A method for consistently rendering a graphical control component for both a web page and a non-markup language application on a computer display upon receiving a graphical control component rendering request, the method comprising:
   providing a themed control dynamic link library within a computer operating system;
   providing a fusion component linking each non-markup language application with the themed control dynamic link library within the computer operating system, the fusion component enabling theming of the non-markup language application graphical control component within each non-markup language application without altering the non-markup language application;
   responding to each rendering request from both the web page and the non-markup language application through a theme manager, the theme manager connected with the themed control dynamic link library to communicate with the non-markup language application and with an alternate dynamic link library to communicate with the web page;
   when responding to a web page graphical control component rendering request, determining whether a defined theme META tag is present and affirmatively set in the web page;
   routing the web page graphical control component rendering request to the theme manager if the defined theme META tag is present and affirmatively set, the theme manager having tools responsible for rendering graphical control components in accordance with at least one defined theme for both the web page and non-markup language applications; and
   rendering the graphical control component.

2. The method of claim 1, further comprising rendering the graphical control component using the tools provided by the theme manager to display appearance characteristics of an active defined theme if a themed appearance is desired.

3. The method of claim 1, further comprising rendering the graphical control component in accordance with a default mode for the web page if an active defined theme provided by theme manager does not include appearance characteristics for the requested component.

4. The method of claim 1, further comprising providing a set of appearance characteristics through the theme manager, the set comprising at least parts information and location information for the requested graphical control component.

5. The method of claim 4, wherein the set of appearance characteristics additionally comprises state information indicating a state of the control.

6. The method of claim 1, further comprising:
   determining, if the theme META tag is set to indicate a themed appearance is desired, whether the web page has specified cascading style sheet properties;

if cascading style sheet properties are specified, determining whether the specified properties are one of a number of predetermined properties desired to be ignored; and applying only those cascading style sheet properties that are not one of the predetermined properties to be ignored.

7. The method of claim 1, further comprising rendering the requested control utilizing a standard look that is not themed by the appearance manager if the theme META tag is not present.

* * * * *

UNITED STATES PATENT AND TRADEMARK OFFICE
CERTIFICATE OF CORRECTION

PATENT NO. : 6,957,394 B1
APPLICATION NO. : 09/728725
DATED : October 18, 2005
INVENTOR(S) : Fernandez et al.

Page 1 of 1

It is certified that error appears in the above-identified patent and that said Letters Patent is hereby corrected as shown below:

In column 1, line 42, delete "red'"" and insert -- red'> --, therefor.

In column 7, line 6, delete "User32.d11" and insert -- User32.dll --, therefor.

In column 7, line 6, delete "ComCtl32.d11" and insert -- ComCtl32.dll --, therefor.

In column 7, line 12, delete "ComCt132.d11" and insert -- ComCtl32.dll --, therefor.

In column 7, line 19, after "code" delete "to".

In column 10, line(s) 10-11, delete "MSHTML.d11" and insert -- MSHTML.dll --, therefor.

In column 13, line 30, delete "pageare" and insert -- page are --, therefor.

Signed and Sealed this

Eighth Day of September, 2009

David J. Kappos
*Director of the United States Patent and Trademark Office*